(12) United States Patent
Kim

(10) Patent No.: US 7,417,865 B2
(45) Date of Patent: Aug. 26, 2008

(54) SEMI-AUTOMATIC SLIDING DEVICE FOR SLIDING-TYPE PORTABLE TERMINAL

(75) Inventor: Kyung-Chul Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 287 days.

(21) Appl. No.: 11/222,188

(22) Filed: Sep. 8, 2005

(65) Prior Publication Data

US 2006/0154703 A1    Jul. 13, 2006

(30) Foreign Application Priority Data

Jan. 7, 2005    (KR) .................... 10-2005-0001879

(51) Int. Cl.
*H05K 7/12*    (2006.01)
(52) U.S. Cl. .................. 361/727; 361/679; 455/575.4
(58) Field of Classification Search ................ 361/727, 361/679; 455/575.4
See application file for complete search history.

(56) References Cited

U.S. PATENT DOCUMENTS

| | | | |
|---|---|---|---|
| 6,822,871 B2 | 11/2004 | Lee et al. | |
| 7,106,597 B2* | 9/2006 | Kao et al. | 361/748 |
| 7,218,509 B2* | 5/2007 | Liao et al. | 361/679 |
| 2005/0009581 A1* | 1/2005 | Im et al. | 455/575.4 |

* cited by examiner

*Primary Examiner*—Jayprakash N Gandhi
*Assistant Examiner*—Ingrid Wright
(74) *Attorney, Agent, or Firm*—The Farrell Law Firm, PC

(57) ABSTRACT

Disclosed herein is a semi-automatic sliding device for a sliding-type portable terminal that includes a stationary member, a movable member adapted to slide under constraint while facing the stationary member by means of a closing force when out of a predetermined distance and an opening force when within the predetermined distance, at least one rolling means pressed against a lateral end of the movable member, and at least one semi-automatic driving source positioned between the stationary and movable members to provide the movable member with the opening or closing force as the movable slides. The semi-automatic sliding device is advantageous to slimness.

14 Claims, 5 Drawing Sheets

SEMI-AUTOMATIC SLIDING DEVICE FOR SLIDING-TYPE PORTABLE TERMINAL

PRIORITY

This application claims priority to an application entitled "Semi-automatic Sliding Device for Sliding-type Portable Terminal" filed with the Korean Intellectual Property Office on Jan. 7, 2005 and assigned Serial No. 2005-1879, the contents of which are incorporated herein by reference.

BACKGROUND OF THE INVENTION

1. Field of the Invention

The present invention relates to digital communication portable terminals including cellular phones, PDAs (Personal Digital Assistants), HHPs (Hand Held Phones), camera phones, and game phones, and more particularly to a semi-automatic sliding device for a sliding-type portable terminal.

2. Description of the Related Art

In general, "portable communication apparatus" refers to an electronic apparatus that a user can carry to perform wireless communication with a desired partner. To facilitate portability, designs of a portable communication apparatus tend not only to be compact, slim, and light, but are also moving toward providing multimedia availability, having a wider variety of functions. In particular, future portable communication apparatuses are expected to incorporate greater multi-functionality and be capable of multi-purpose utilization, as well as to be more compact, light, and capable of being modified to be suitable for various multimedia or Internet environments. Additionally, portable communication apparatuses are now commonly used by people of all ages and all walks of life throughout the world, and are considered by some people as a nearly indispensable commodity which must be carried all the time.

A portable communication apparatus may be classified into various categories according to appearance, such as a bar-type portable communication apparatus, a flip-type portable communication apparatus, and a folder-type portable communication apparatus. A portable communication apparatus may also be classified as a neck wearable type portable communication apparatus or a wrist wearable type portable communication apparatus according to the position or way in which a user puts on the portable communication apparatus. In addition, a portable communication apparatus may be classified into a rotation-type portable communication apparatus and a sliding-type portable communication apparatus according to the manner of opening and closing the portable communication apparatus. These variously classified portable communication apparatuses can be easily understood by those skilled in the art.

Meanwhile, conventional portable communication apparatuses now tend to transmit data at a high speed in addition to performing the basic voice communication function. In other words, in response to increased consumer demand, a portable communication, apparatus will typically provide a service using a wireless communication technology capable of transmitting data at high speed.

Recent portable communication apparatuses also tend to be equipped with a camera lens to obtain video signals for transmission. In particular, current portable communication apparatuses have an external or embedded camera lens module which enable a user to perform video communication with a desired partner or to photograph a desired subject.

However, conventional sliding-type portable communication apparatuses, as disclosed in Korean Patent Application No. 2002-71911, and related U.S. Pat. No. 6,822,871, the contents of which are incorporated herein by reference, have a problem in that it is difficult to manufacture them in a slim size, because the main housing and the sliding module for opening/closing the sliding housing cannot be made in a slim size. This results from the fact that a torsion spring for providing a force necessary for opening/closing the sliding housing from/on the main housing is positioned between the front and rear covers. Furthermore, the sliding device for conventional sliding-type portable communication apparatuses has a large number of components, resulting in a complicated assembly process that can quickly deteriorate.

SUMMARY OF THE INVENTION

Accordingly, the present invention has been made to solve the above-mentioned problems occurring in conventional terminals, and an object of the present invention is to provide a semi-automatic sliding device having a driving source for providing an opening/closing force positioned in the lateral direction for improved slimness of a portable terminal.

Another object of the present invention is to provide a semi-automatic sliding device adapted to be semi-automatically opened/closed for convenient opening/closing.

Another object of the present invention is to provide a semi-automatic sliding device having a protrusion and a recess formed on a stationary member and a movable member, respectively, for improved slimness of a portable terminal.

Another object of the present invention is to provide a semi-automatic sliding device having a protrusion and a recess formed on a stationary member and a movable member, respectively, and a roller adapted to roll on a lateral surface of the movable member for optimum slimness of a portable terminal.

In order to accomplish these objects, there is provided a semi-automatic sliding device for a sliding-type portable terminal including a stationary member, a movable member adapted to slide under constraint while facing the stationary member by means of a closing force when out of a predetermined distance and an opening force when within the predetermined distance, at least one rolling means pressed against a lateral end of the movable member, and at least one semi-automatic driving source positioned between the stationary and movable members to provide the movable member with the opening or closing force as the movable slides.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Figure 1:
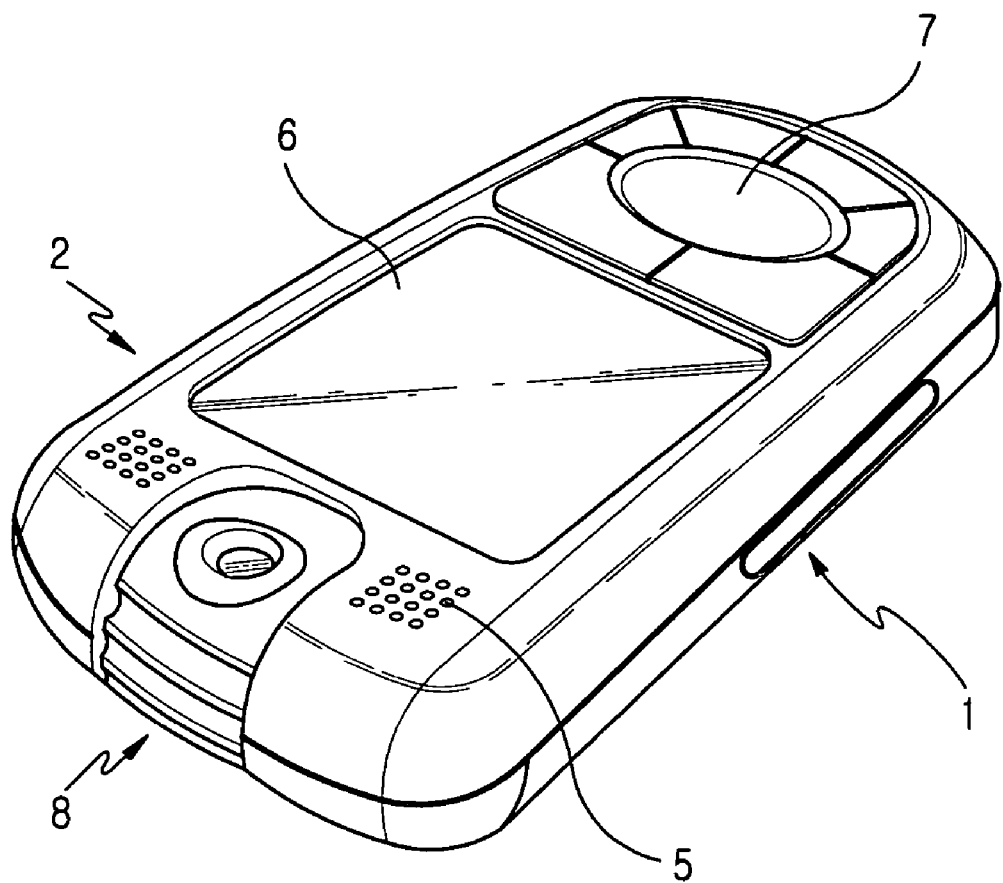
FIG. 1 is a perspective view showing a semi-automatic sliding device according to a preferred embodiment of the present invention.
Figure 2:
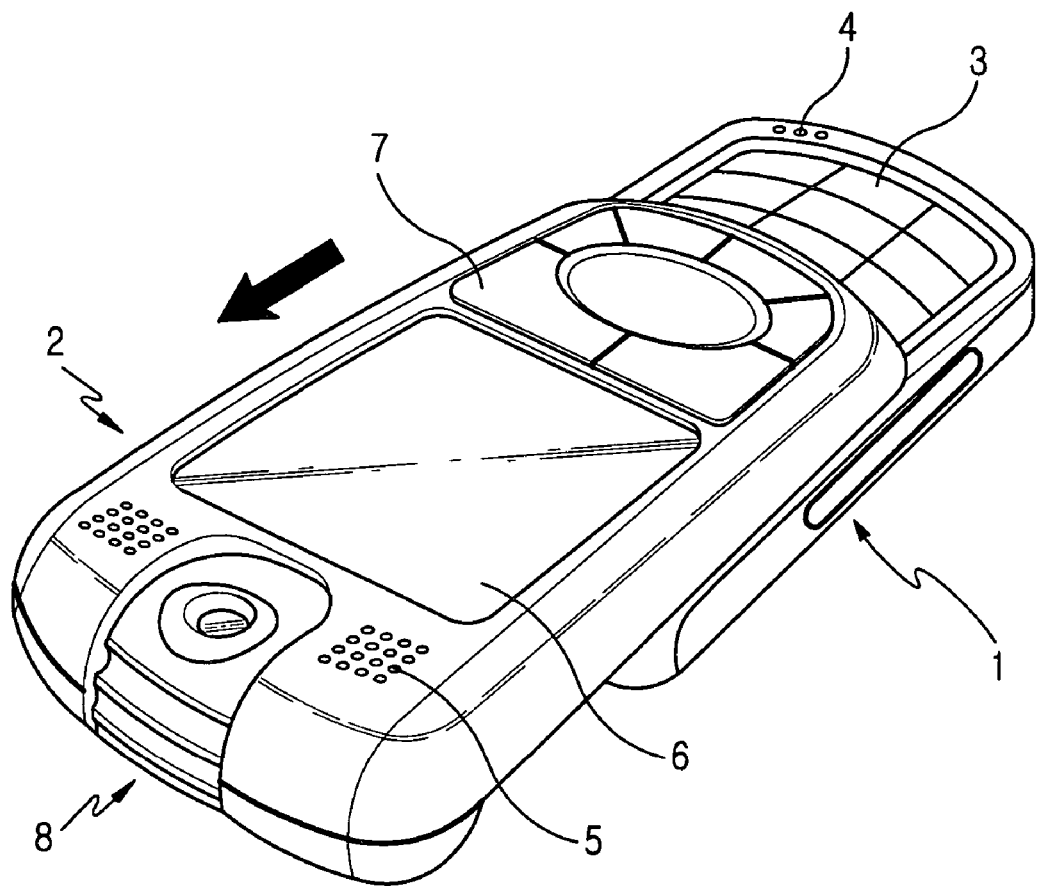
FIG. 2 is a perspective view of a sliding housing shown in FIG. 1, when completely opened.

As shown in FIGS. 1 and 2, a sliding-type portable terminal equipped with a semi-automatic sliding device according to the present invention includes a main housing 1, a sliding housing 2, and a semi-automatic sliding device positioned between the main and sliding housings 1 and 2 to open/close the sliding housing 2 from/on the main housing 1. The semi-automatic sliding device will be described later in more detail.

The semi-automatic sliding device provides a force in such a direction that, when the sliding housing 2 is beyond a predetermined distance away from the main housing 1, the sliding housing 2 is opened from the main housing 1 and, when the sliding housing 2 is within the predetermined distance, it is closed on the main housing 1. Specifically, the sliding housing 2 initially receives a manual force from the user up to the predetermined distance, and then receives an opening force from the semi-automatic sliding device when beyond, or out of, the predetermined distance.

The main housing 1 has a plurality of first keys 3 and a microphone device 4 positioned on an upper surface thereof. The sliding housing 2 has a speaker device 5, a display device 6, and a plurality of second keys 7 positioned thereon. The first keys 3 are adjacent to the microphone device 4, the speaker device 5 is adjacent to the display device 6, and the display device 6 is adjacent to the second keys 7. When the sliding housing 2 is completely closed on the main housing 1, as shown in FIG. 1, the first keys 3 and the microphone device 4 are hidden, while the speaker device 5, the display device 6, and the second keys 7 are always exposed to the user. When the sliding housing 2 is completely opened from the main housing 1, as shown in FIG. 2, the first keys 3, the microphone device 4, the speaker device 5, the display device 6, and the second keys 7 are exposed to the user and the first and second keys 3 and 7 are preferably positioned adjacent to each other.

Figure 3:
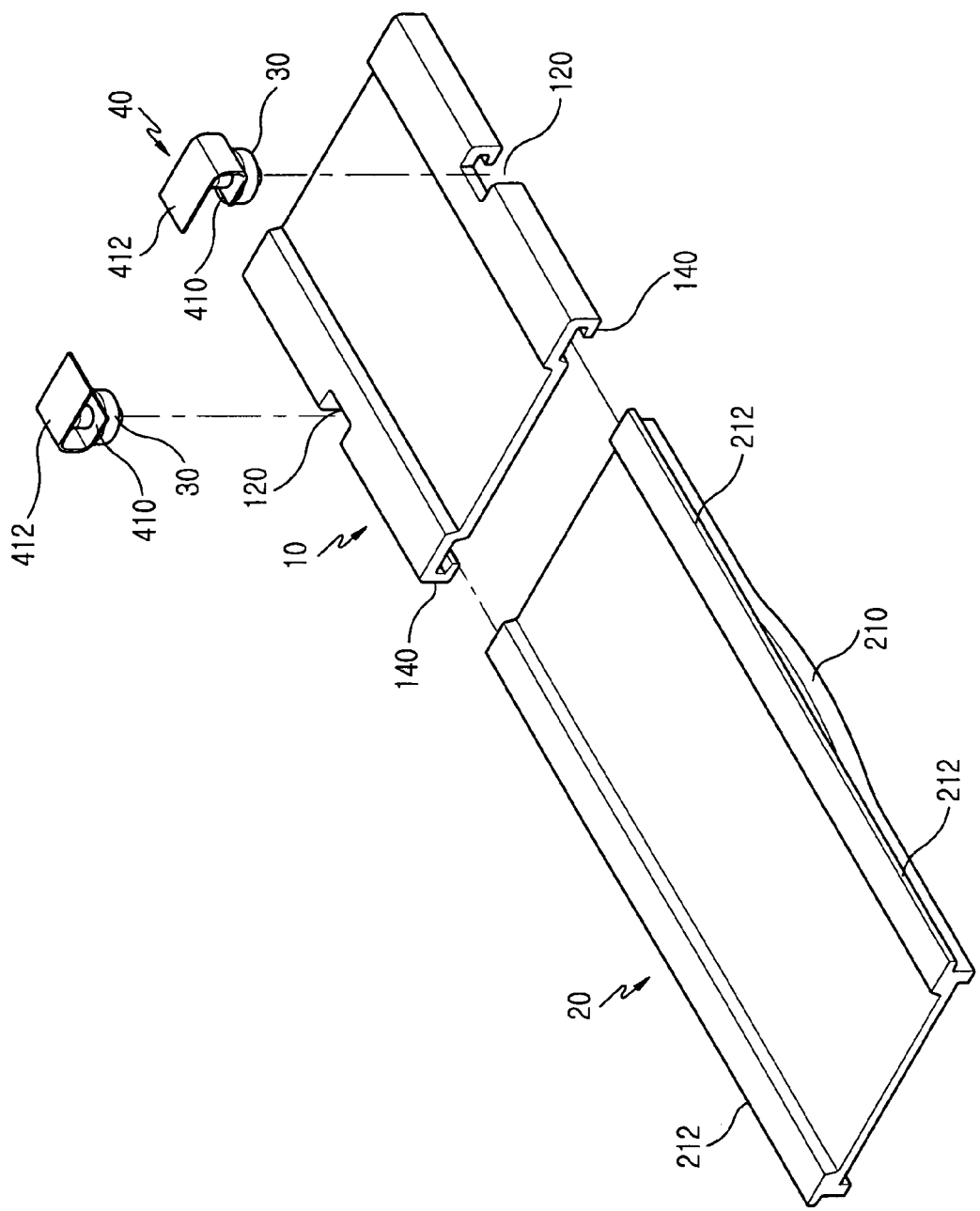
FIG. 3 is an exploded perspective view showing the construction of a semi-automatic sliding device according to a preferred embodiment of the present invention.
Figure 4:
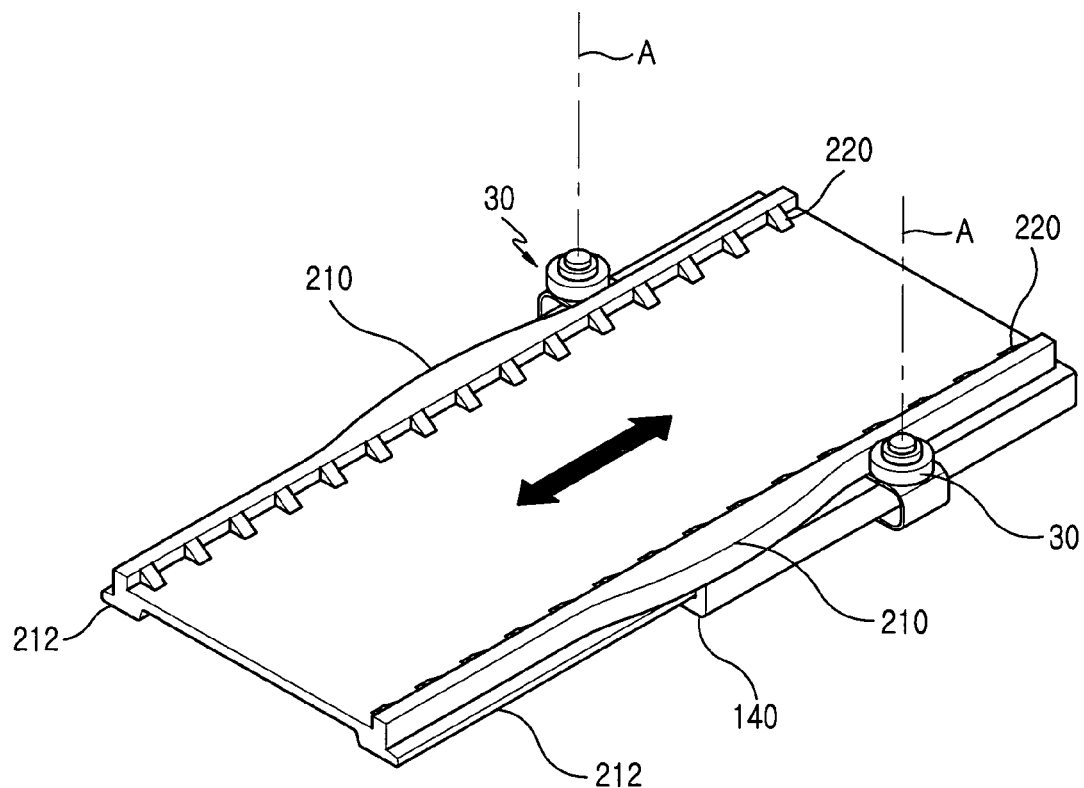
FIG. 4 is an assembled perspective view showing a semi-automatic sliding device according to a preferred embodiment of the present invention.
Figure 5:
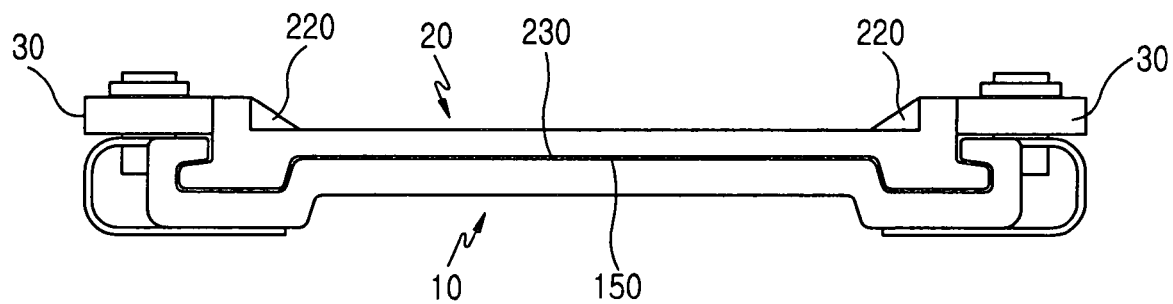
FIG. 5 is a front view of the semi-automatic sliding device shown in FIG. 4.

The construction of the semi-automatic sliding device according to the present invention will now be described with reference to FIGS. 3 to 5. As shown in FIGS. 3 to 5, the semi-automatic sliding device according to the present invention includes a stationary member 10, a movable member 20 adapted to slide under constraint while facing the stationary member 10 via a closing force when out of the predetermined distance and an opening force when within the predetermined distance, at least one roller 30 pressed against a lateral end of the movable member 20, and at least one semi-automatic driving source positioned between the stationary and movable members 10 and 20 to provide the movable member 20 with the opening or closing force as the movable slides 20. The stationary and movable members 10 and 20 are positioned on the main and sliding housings 1 and 2, respectively, and may be constructed of plastic or light metallic material.

The roller 30 is preferably made up of plastic or rubber material. The roller 30 is positioned on the stationary member 10 by the semi-automatic driving source, particularly by an elastic body (described later), and receives a force in a direction that presses the rollers 30 against the lateral end of the movable member 20. As shown in FIG. 4, the rollers 30 has a rotation axis A extending in a direction perpendicular to the sliding direction of the sliding housing 20. Two roller 30 are shown in FIGS. 3 to 5, and it is preferable to have a pair of roller 20 and a pair of semi-automatic driving sources symmetrically positioned to balance the sliding motion.

The semi-automatic driving source includes a protrusion 210, a part of which gradually protrudes from a lateral end of the movable member 20 in a lateral direction and an elastic body 40 for pressing the roller 30 against the protrusion 210. The protrusion 210 has a curved shape and is adapted to slide while contacting the roller 30. The protrusion 210 is preferably positioned at an intermediate region, defining a predetermined distance The elastic body 40 is preferably a metallic leaf spring having an end 410 on which the roller 30 is positioned and an other end 412 which is fixed to the stationary member 10. The elastic body 40 is bent in such a manner that the ends 410 and 412 face each other and provides an elastic force in such a direction that they approach each other. The elastic force from the elastic body 40, which presses the roller 30 against the lateral end, is limited by the roller 30.

The stationary member 10 has at least one opening 120 symmetrically formed to receive the elastic body 40.

The movable member 20 is adapted to slide on the stationary member 10 while continuously facing the stationary member 10, as described earlier. A constraint is positioned between the stationary and movable members 10 and 20. The constraint includes a guide bending portion 140 positioned on a lateral end of the stationary member 10 and a guide protrusion 212 protruding from a lateral end of the movable member 20 in the lateral direction to be inserted into the guide bending portion 140. The constraint is preferably symmetrically configured.

Preferably, as shown in FIGS. 4 and 5, the movable member 20 has a number of reinforcement portions 220 positioned on an upper surface thereof, in particular on an outer periphery of the upper surface, along the sliding direction to provide structural rigidity in the sliding direction or in a direction perpendicular to the sliding direction.

As shown in FIGS. 4 and 5, the movable member 20 linearly travels while continuously facing the stationary member 10. The stationary and movable members 10 and 20 may be made up of plastic or metallic material. A gap is provided between the stationary and movable members 10 and 20 when the movable member 20 slides on the stationary member 10. This is because the semi-automatic driving source for providing the movable member 20 with an opening/closing force is positioned in the lateral direction of the movable member 20. Specifically, the gap is small in size and is created between the stationary and movable members 10 and 20 facing each other and the semi-automatic driving source positioned in the lateral direction of the stationary and movable members 10 and 20 are advantageous to slimness. In addition, the stationary and movable members 10 and 20 are provided with a protrusion 150 and a recess 230, respectively, which are coupled to each other and contribute to slimness. This renders the constraint of the stationary and movable members 10 and 20 slim. Particularly, the protrusion 150 has a space formed on the bottom surface thereof, in which other electronic components of the main board (not shown) can be mounted.

As mentioned above, the present invention provides a structure advantageous to design of a slim portable terminal. Accordingly, the portable terminal can be conveniently opened/closed and has improved portability and aesthetic appearance due to slimness.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A semi-automatic sliding device for a sliding-type portable terminal comprising:
   a stationary member;
   a movable member adapted to slide under constraint while facing the stationary member via a closing force when out of a predetermined distance and an opening force when within the predetermined distance;
   at least one roller elastically mounted to the stationary member and pressed against a lateral end of the movable member, each roller being received in an opening of the stationary member; and
   at least one semi-automatic driving source positioned between the stationary and movable members to provide the movable member with the opening and closing force.

2. The semi-automatic sliding device as claimed in claim 1, wherein the stationary member has a protrusion formed on an upper surface thereof in a planar shape and a recess formed on a lower surface thereof into which the protrusion is inserted.

3. The semi-automatic sliding device as claimed in claim 1, wherein the roller is positioned on the semi-automatic driving source and provided with a force pressing the roller against the lateral end.

4. The semi-automatic sliding device as claimed in claim 1, wherein the roller has a rotation axis which is perpendicular to the sliding direction of the movable member.

5. The semi-automatic sliding device as claimed in claim 1, wherein the semi-automatic driving source comprises a guide portion having a part thereof gradually protruding from a lateral end of the movable member in the lateral direction and having a curved shape and an elastic body for pressing the roller against the guide portion.

6. The semi-automatic sliding device as claimed in claim 5, wherein the guide portion is positioned at an intermediate region of the movable member.

7. The semi-automatic sliding device as claimed in claim 5, wherein the elastic body is a leaf spring having an end on which the roller is positioned and an other end which is positioned on the stationary member with both ends being positioned to face each other and provided with an elastic force in a direction approaching each other.

8. The semi-automatic sliding device as claimed in claim 1, wherein the stationary member has an opening for containing only the rolling shaft of the roller, not other parts thereof.

9. The semi-automatic sliding device as claimed in claim 1, wherein a constraint is provided between the stationary and movable members comprising a guide bending portion positioned on a lateral end of the stationary member and a guide protrusion protruding from a lateral end of the movable member in a lateral direction to be inserted into the guide bending portion.

10. The semi-automatic sliding device as claimed in claim 1, wherein the movable member has a plurality of reinforcement portions uniformly positioned between an outer periphery and an lateral end of an upper surface thereof.

11. The semi-automatic sliding device as claimed in claim 1, wherein the stationary and movable members, the roller, and the semi-automatic driving source are symmetrically configured.

12. The semi-automatic sliding device as claimed in claim 1, wherein the stationary and movable members are constructed of plastic or metallic material.

13. The semi-automatic sliding device as claimed in claim 1, wherein the movable member is adapted to linearly slide on the stationary member while continuously facing the stationary member.

14. The semi-automatic sliding device as claimed in claim 1, wherein a gap is provided between the stationary and movable members.

* * * * *